Aug. 28, 1928.  
J. MOSCA  
1,682,623  
BELT SCRAPER FOR TRACTORS  
Filed Oct. 15, 1926  
2 Sheets-Sheet 2
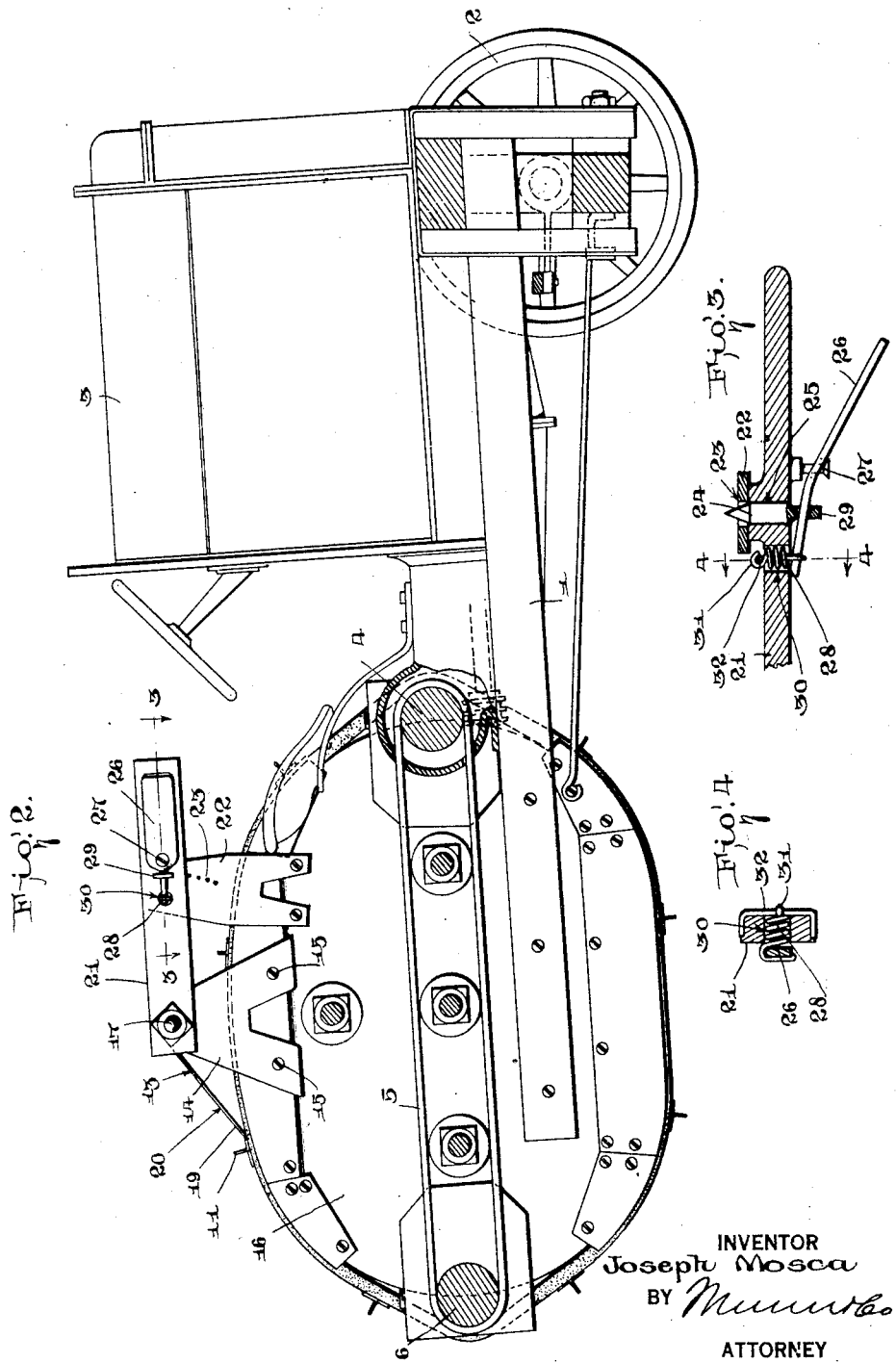
INVENTOR  
Joseph Mosca  
BY  
ATTORNEY Patented Aug. 28, 1928.

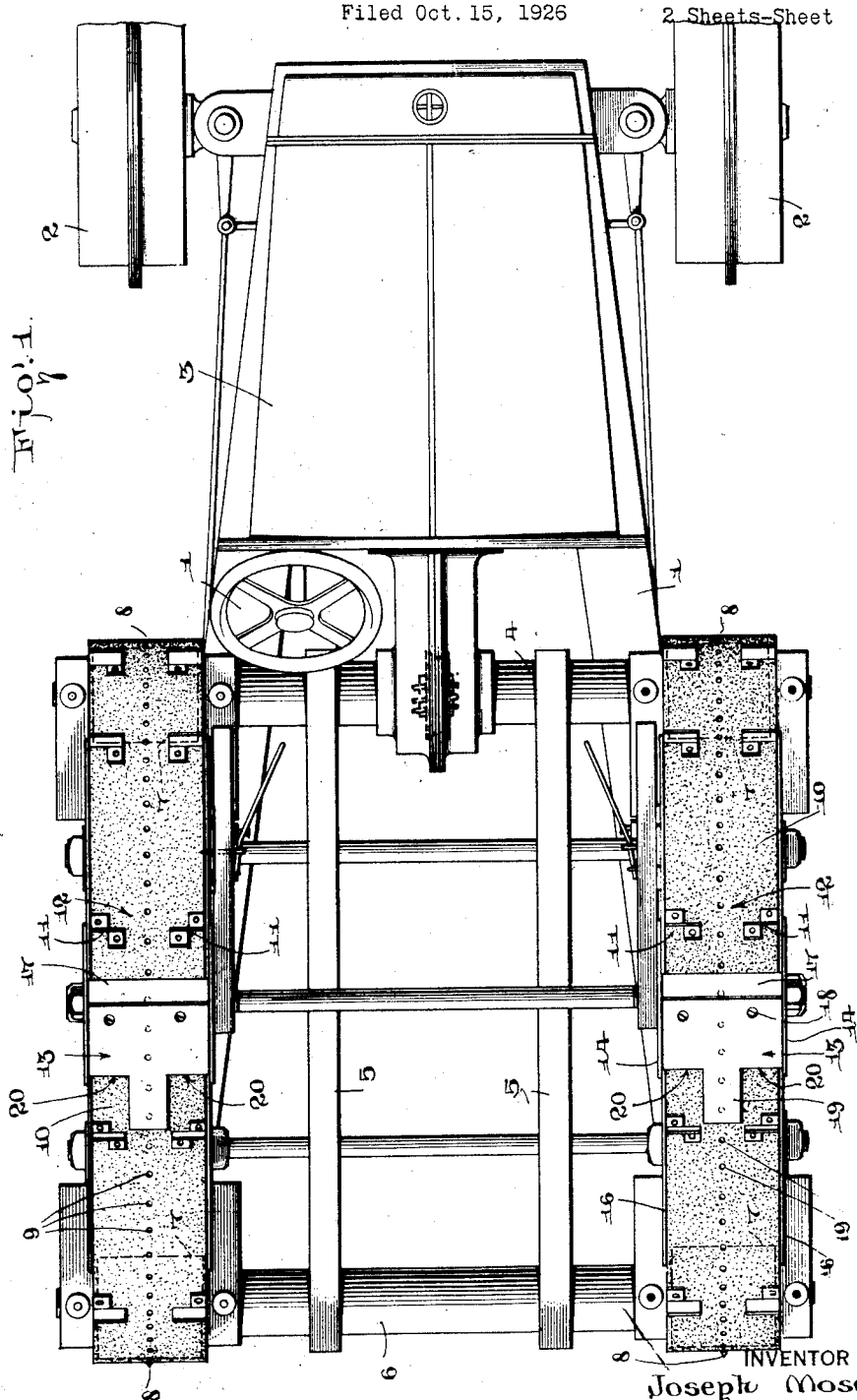

1,682,623

UNITED STATES PATENT OFFICE.

JOSEPH MOSCA, OF ROUSE, COLORADO.

BELT SCRAPER FOR TRACTORS.

Application filed October 15, 1926. Serial No. 141,808.

This invention relates to improvements in belt scrapers for tractors and the like, an object being to provide a scraper for principally cleaning the central portion of the treads and for dislodging most of the material adhering to the lugs.

Other objects and advantages appear in the following specification, reference being had to the accompanying drawings in which Figure 1 is a plan view of a tractor showing one of the scraper attachments.

Figure 2 is a longitudinal sectional view showing one of the scraper attachments.

Figure 3 is a detail section taken on the line 3—3 of Figure 2.

Figure 4 is a detail cross section taken on the line 4—4 of Figure 3.

The tractor presently to be described is of the type designed for the particular purpose of traveling over snow covered land and other purposes, this use necessitating the provision of a scraper for each of the treads so that an undue amount of snow may not collect and interfere with the operation thereof. The tractor frame 1 carries a pair of front wheels 2, which in practice are steered by suitable mechanism, there being a suitable engine beneath the hood 3 for driving the forward axle 4.

Belts 5 drive the rear axle 6. Each of the axles carries wheels 7 at its ends, the points or teeth 8 of which are engageable with perforations 9 in the belts or treads 10 for applying the driving power.

It is with use on tread belts such as these that the invention is chiefly concerned. Each of the belts has two series of upstanding edge grippers or lugs 11 for the purpose of so engaging snow covered surfaces, etc., that there will be no slipping. The lugs are located adjacent to the edges of the belts leaving a free channel in the middle. It is along this channel that the perforations 9 are located, and provision is made of a scraper 13 of novel construction and arrangement for clearing the tread belt of adhering material to a considerable extent as well as scraping the material from the tread belt surfaces adjacent to the perforations, at least one scraper being used for each belt. The description of one scraper will suffice for both because they are alike in construction and operation.

A pair of brackets 14 secured at 15 as in Fig. 2 to the side enclosures 16 of the tread belt provides the pivotal support for the ends of an axle or rock shaft 17 to which the scraper 13 is tangentially secured as at 18. According to the present showing the axle or shaft between the brackets 14 is made square, but obviously it may be made otherwise with equally good results. The scraper 13 comprises a main portion approximately as wide as the tread belt 10, and a tongue extension 19 of a width substantially equal to the width of the channel 12.

It is observed in Figure 2 that the shoulder 20, formed between the main portion of the scraper and the tongue 19 thereof, takes a position approximately level with the upper edges of the lugs 11. This circumstance insures that snow or other material adhering to the tread belt between the lugs and near the edges of the belt will be loosened and removed at least down to the level of the lugs themselves. The tongue 19 is made to engage the belt and serve to scrape off any adhering material in the vicinity of the perforations.

An adjusting lever or handle 21, secured to one end of the axle 17 beyond the inner bracket 14 moves over the equivalent of a quadrant which in this case is an upstanding bracket 22 having a plurality of perforations 23 arranged on the arc of a circle struck from the axle 17 as a center. The perforations are adapted to be entered by a pin 24 to hold the lever in its adjusted positions. The pin is movable in an opening 25 in the lever, being carried by a detent 26 which is so pivoted at 27 that rocking motion of the detent will retract the pin against the tension of a spring 28 connected with one extremity of the detent. The pin has an apertured head 29 with which the detent engages at a point between the pivot 27 and the spring 28.

The spring 28 occupies an opening in the lever 21. One bent extremity of the spring engages around the end of the detent 26, the other extremity being bent on a curve as at 21 to receive a slender wire 32 which serves to sustain the spring in position.

The operation is readily understood. The scraper 13 is composed of a plate of suitable material having a degree of flexibility so that the obstructions which it will encounter, such as snow, mud, etc., will be readily dislodged without much danger of breakage. It is advisable to keep the tread belt 10 as free from snow, mud, etc., as possible, it being particularly desirable to scrape adhering material from the central portion or channel of the tread belt in which the perforations 9 are located.

The tongue extention 19 is made to bear upon the surface of the tread belt with a degree of pressure depending upon the adjustment of the lever 21. The broad part or main part of the scraper does not engage the tread belt because the upstanding lugs 11 must be permitted to pass under. The formation of the scraper results in shoulders 20, but these, as shown in Figure 2, pass over the lugs and serve to dislodge adhering material at least down to the approximate level of the lugs.

The particular mode of mounting the detent 26 as in Figures 3 and 4, is relatively simple and provides an effective device for holding the lever 21 in its various adjusted positions. While the arrangement of the improved belt scraper is that of a generally preferred form, obviously modifications and changes may be made without departing from the spirit of the invention or scope of the claims.

I claim:—

1. A scraper attachment for tractive belts comprising belt embracing supports, a rock shaft journaled therein to overlie and traverse an embraced belt and having a portion of its peripheral surface flattened, a resilient scraper blade secured adjacent one end to the flattened surface of said rock shaft in tangential relation thereto, an adjusting handle secured to one end of said shaft, and means for releasably holding said handle in different adjusted positions of the rock shaft and its tangential scraper blade.

2. A scraper attachment for tractive belts comprising belt embracing plates, a rock shaft extending therethrough and journaled therein to traverse and overlie an embraced belt and of polygonal cross section between said plates, a scraper blade secured at one end to one of the faces of the polygonal portion of the rock shaft, a stationary detent plate having an arcuate series of detents therein coaxial with the rock shaft, an adjusting handle secured to the rock shaft beyond the belt embracing plates and having adjacent bores therethrough, a release lever pivoted on said handle adjacent to a bore, a dog housed in said bore in alinement with said arcuate detents having slotted connection with the lever, and a spring housed in the next adjacent bore cooperating with the lever normally to project the dog for detent engagement.

JOSEPH MOSCA.